United States Patent Office.

SCHUYLER W. MAHAN, OF ADRIAN, MICHIGAN.

Letters Patent No. 105,226, dated July 12, 1870.

IMPROVEMENT IN LEMON FRUIT SIRUP.

The Schedule referred to in these Letters Patent and making part of the same.

*To all whom it may concern:*

Be it known that I, SCHUYLER W. MAHAN, of Adrian, in the county of Lenawee and State of Michigan, have invented a certain compound called Lemon Fruit Sirup, to be used both as a beverage and as a flavoring medium in cooking and pastry.

The nature of this invention consists in—

First, mixing extra "C" sugar with boiling water.
Second, adding sliced lemon while boiling.
Third, adding tartaric acid dissolved in boiling water, and straining the compound while hot.
Fourth, when nearly cool, put up in bottles, adding a litle of the solution of oil of lemon and alcohol, all in the manner and in the proportions hereinafter more fully set forth.

To compound and manufacture my improved lemon-fruit sirup, take five gallons of water and put into a clean porcelain-lined tin or Russia-iron vessel, capable of holding at least fifteen gallons. Cast-iron, copper, or brass vessels should not be used.

Bring to a boiling heat. Then add ten pounds of extra "C" sugar, stirring well from the bottom to prevent burning.

As soon as fully dissolved, add ten pounds more of the same kind of sugar, and continue the boiling as before, and, when all dissolved, add another ten pounds and stir, and so on, adding ten pounds at each time until fifty pounds shall have been added; and all thoroughly dissolved, taking great care to see to it that every lump of sugar is fully dissolved, for, should there be one lump not dissolved, it would fall to the bottom and become burned, and thus ruin the whole batch.

This extra "C" sugar imparts to sirup a rich lemon color.

Then take from two to three eggs, and add a table-spoonful of flour to each egg, and beat them together.

The object of adding the flour is to subdivide the eggs and cause them to mix thoroughly with the sugar and water.

The object of the eggs is to refine and clarify the sirup.

This mixture of eggs and flour must have been previously prepared, so that it can be added to the sugar and water immediately after the last ten pounds of sugar have been added.

As fast as the scum rises to the surface, remove it with a skimmer, and continue the skimming until all the sediment from the bottom shall have arisen and been removed.

Continue the boiling until the sirup shall be, when cool, of the desired consistency, which may be ascertained by cooling a small portion of it in a saucer.

Next take three dozen lemons and cut off each end down to the pulp, and then slice into thin slices, removing all seeds from the slices, and add the latter to the boiling sirup, and continue the boiling until the lemon shall become cooked, which will require from twenty to thirty minutes.

Then remove the lemon from the boiling sirup with a skimmer, and immediately strain the sirup through a fine white flannel cloth, and, while straining through the cloth, add one and three-fourths pound of tartaric acid, thoroughly dissolved in one and a half pint of boiling water.

This last mixture must be previously prepared so as to be used at this time, that both may go through the strainer at once, after which stir thoroughly.

Then rinse the strainer, and put the pieces of sliced lemon that had been cooked and skimmed off into the strainer, and squeeze out all the juice that can be got out, and add to the above.

Now, place three or four of these lemon slices into bottles holding, say, about twenty-two ounces each, adding, at the same time, to each bottle from two to three drams of a mixture composed of one ounce of alcohol and three-fourths of a dram of the oil of lemon, or, if desirable, more of the lemon fruit in its place.

Now, from the cask into which the sirup had been strained, fill up the bottles through a wooden faucet, giving each bottle a slight stroke while it is being filled.

No brass, iron, or copper vessel, tube, or faucet, should be used in the manufacture of this sirup, owing to the corroding influence the acids may have upon them.

This sirup, when bottled and corked up with a simple cork, and without sealing, is ready for use, and will not freeze in the coldest weather, nor become affected in any way by the heat of summer or the direct rays of the sun, and will keep for years; in fact, age makes it better.

Uses.

As a flavor, this sirup is invaluable in cooking, making pastry, &c. In making cakes it takes the place of cream-tartar, sour milk, &c. In some cases it has been used with equal success without the use of eggs.

It is also used as a flavor for sauces, pies, and puddings, and, by taking four drams of this sirup, mixed with three and a half or four ounces of ice-water, we have a delightful cooling beverage.

Claim.

I claim as my invention—

The manufacture of a compound which I denominate lemon fruit sirup, composed of the several above-named ingredients, combined in the manner and proportions, and for the purposes herein set forth and described.

SCHUYLER W. MAHAN.

Witnesses:
J. E. TOOKER,
C. MILLER.